UNITED STATES PATENT OFFICE.

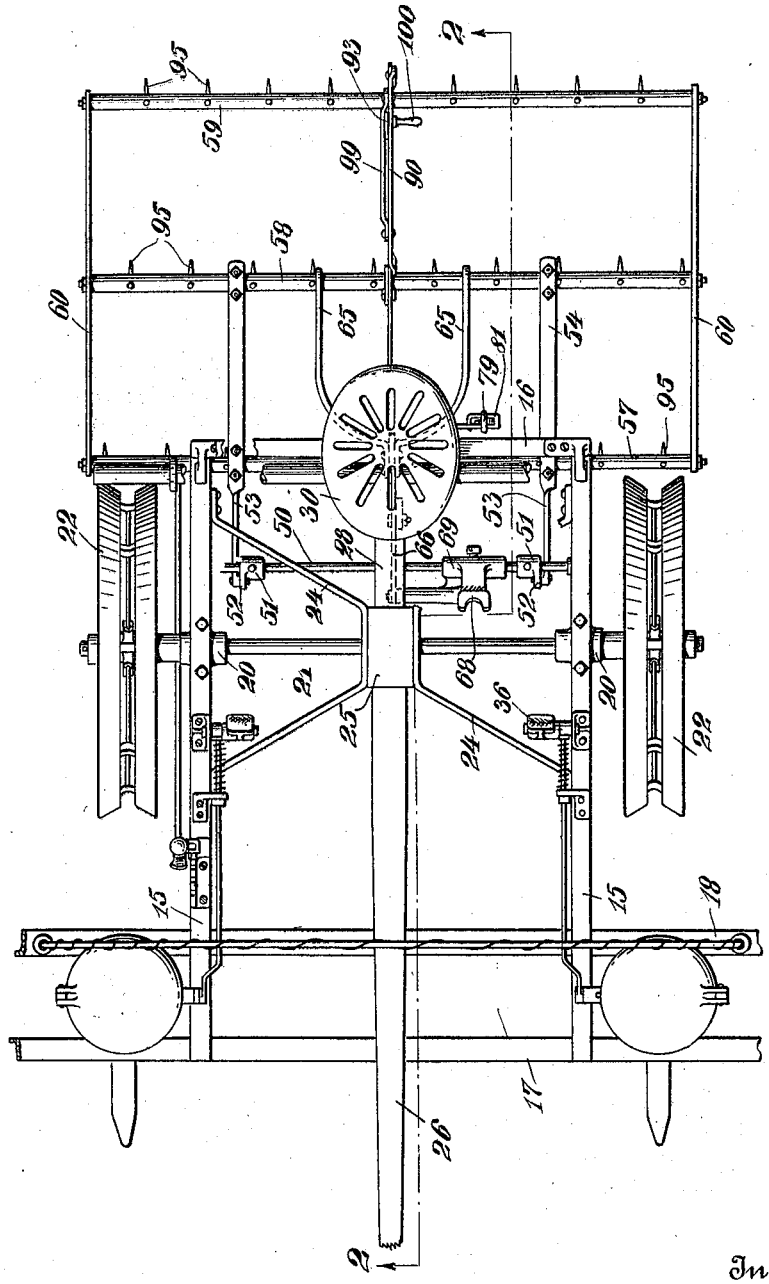

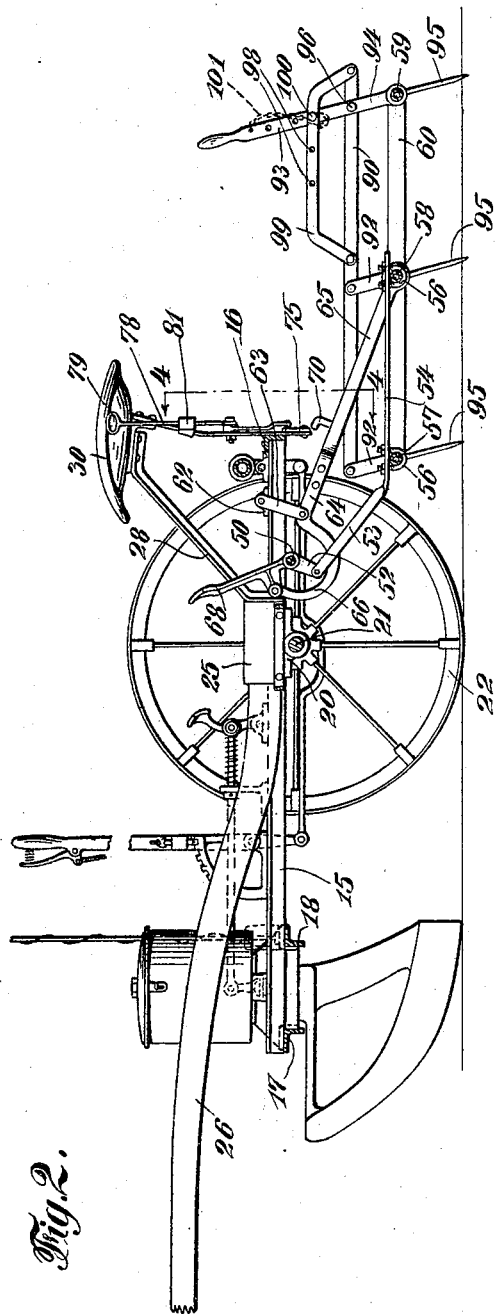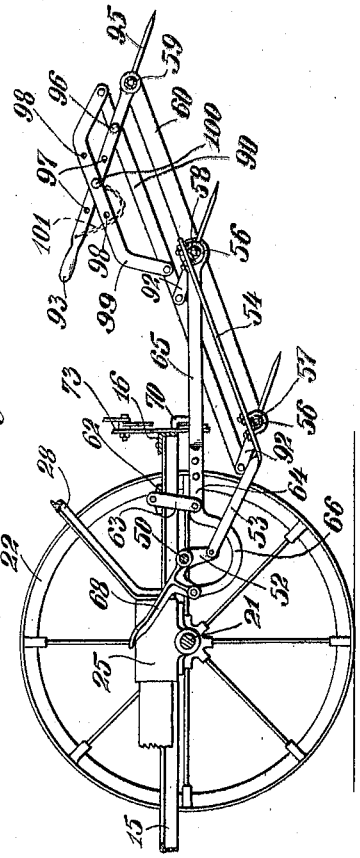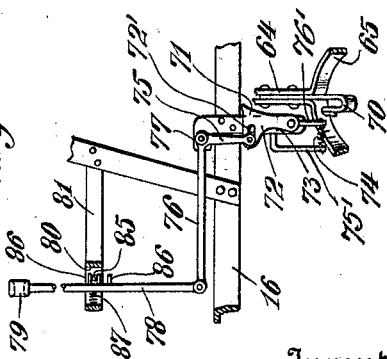

NELS LARSEN BECK, OF EXIRA, IOWA.

HARROW.

REISSUED 1,300,554.   Specification of Letters Patent.   Patented Apr. 15, 1919.

Application filed November 1, 1917. Serial No. 199,626.

*To all whom it may concern:*

Be it known that I, NELS LARSEN BECK, a citizen of the United States, and a resident of Exira, in the county of Audubon and State of Iowa, have invented certain new and useful Improvements in Harrows, of which the following is a specification.

The present invention has reference to improvements in harrows and has for its principal object to provide means whereby the harrow may be quickly and conveniently raised, as at turning corners and passing along roadways, the same being automatically held in a raised position as long as desired, the operation of raising or releasing being accomplished by a driver without moving from the seat.

The above and additional objects are attained by the novel construction and combination of parts hereinafter described and shown in the accompanying drawings, forming a material part of this specification and in which:—

Figure 1 is a top plan view showing an embodiment of the invention, parts being broken away to disclose the construction.

Fig. 2 is a longitudinal sectional view, taken on line 2—2 of Fig. 1, showing the parts in operative position.

Fig. 3 is a fragmental sectional view, taken in substantially the same plane, but showing the parts in a raised or inoperative position, and Fig. 4 is a fragmental transverse sectional view taken on line 4—4 of Fig. 2.

The frame of the implement comprises two side bars 15, of channel, I beam, or other preferred section rigidly connected at the rear by a cross bar 16, having attached at the front a pair of oppositely disposed transverse angular bars 17 and 18, the frame sides being secured upon bearings 20, in which is journaled an axle 21, mounted in the support wheels 22, the latter including parallel cutting disks having beveled peripheries.

Angularly disposed A shaped braces 24, extend between the side bars 15 and a central block 25, in which is engaged the tongue or pole 26 of the implement, to which a team of draft animals may be attached.

Also secured to the block 25 is a support 28, for the rider's seat 30, the same being at the rear of the axle so as to balance the tongue or pole 26.

Rearward of the axle 21, and pivoted in the frame sides 15, is a shaft 50, to which are secured collars 51, having arms 52, the latter pivotally engaging with flat bars 53, which are turned quartering and bent at an angle, presenting extensions 54, in which are secured eyes 56, containing tubular bars 57 and 58, rotatably secured at their extreme ends by parallel side bars 60, the same extending rearward and containing at their outer ends a third tubular bar 59. The bars 53 together with the tubular bars 57, 58 and 59 and the parallel side bars 60 form a harrow frame.

Mounted in brackets 62 are links 63, the same being pivotally engaged with the riveted ends 64 of a yoke 65, the opposite outer ends of which encircle the center bar 58, while on the end of the yoke, opposite the links 63, is formed a curved loop 66, its extreme front end being pivotally engaged with a lever 68, curved to receive the foot formed with the sleeve 69, and secured to the shaft 50, the same being arranged so that when pressure is applied to the lever 68, the entire construction is raised bodily, and in order to hold the same in a raised position, the following construction is used:—

Engaged between the inner end elements 64 of the yoke is a reëntrantly turned hook 70, the same, when in a raised position, being engageable with the hook 71, formed with a detent 72, pivoted at its lower end on the plate 73, secured to the cross bar 16, the detent being operable by a pin fixed in the end 75, of a bell-crank lever 76, which is held in a normally operative or engaging position by the tension spring 74. This spring 74 has one end disposed against a laterally disposed wall 75' of the plate 73 and is compressed by a finger 76', fixed to the detent, on the movement of the detent by the lever 76.

The bell-crank lever 76 is pivoted on the pin 77 at the upper end of the plate 73, and operated by a draw bar 78, having a hand grip 79, closely adjacent to the seat 30, the bar being slidably engaged in a guideway 80, formed with an arm 81, carried by a support extending up from the rear frame element 16.

The draw-bar is held, when in either of its positions, by means of a pin 85, fixed in the recess 80, engageable in which are projections 86, set in the bar, which must be pressed against the spring 87 in order to permit disengagement for adjustment of the bell crank lever 76 and the compression of the spring 74 to consequently release the harrow frame.

A bar 90 is arranged centrally of and parallel to the bars 60, over the tubular bars, and is connected therewith by links 92, engaging with the tubes 57 and 58, while near the outer end of the bar 90 is connected a hand lever 93, having a suitably formed link element 94, connecting with the tube 59, so that as the lever 93 is rocked on its fulcrum pin 96, the teeth 95 of the harrow, which are rigidly secured in staggered relation within the tubular bars 57, 58 and 59, are turned or folded upward in the manner of a lazy tong, as shown in Fig. 3. In this condition, the implement may be drawn over a road without interference.

In order to hold the teeth in a raised position, a plurality of perforations 97 are formed through the lever 93, the same being registerable with similar perforations 98, in the raised lock bar 99, rigidly secured to the bar 90, and a lock pin 100 is provided to pass through the perforations when the lever is adjusted, the chain 101 being used to prevent loss of the pin.

When it is desired to make use of the harrow, the lever 93 is pressed backward to its extreme limit, and there held by the pin 100, the hand grip 79 raised, thereby operating the bell-crank lever and withdrawing the detent from the hook 70, allowing the tubular bars to drop into a substantially horizontal position, the teeth 95 becoming vertical and contacting with the surface.

Obviously, in turning corners, or passing over obstructions, the foot lever 68 may be temporarily operated, and released as desired, with or without operating the hand lever.

I am aware that machines for sowing seeds are not new in themselves, moreover that they have been combined with harrow teeth, but the particular form of harrow, together with the means for raising the folding teeth are believed to be new and known to be practical, as are also the means for holding the harrow when in a raised position.

Having thus described my invention what I claim as new and desire to secure by Letters Patent, is:

1. In a device as described, in combination, a main vehicle frame, a support secured thereto, a pair of tubular bars rotatably mounted relatively to said support, side parallel bars connected to said tubular bars, a series of harrow teeth secured upon said tubular bars, a longitudinal bar arranged centrally of and parallel to the side bars over said tubular bars, an outer tubular bar rotatably mounted in said longitudinal bar and side bars, links carried by the last-named bar connected to said pair of tubular bars, a raised lock bar having downwardly-extending divergent portions secured to said longitudinal bar, a hand lever pivoted to the longitudinal central bar short of the outer end and having a link element connected to the outer tubular bar and being in line with the other links, said raised lock bar being formed with a series of longitudinally spaced apart openings, said hand lever adapted to actuate all of said links in order to rotate the tubular bars, and raise the harrow teeth, and a pin passing through said hand lever and into any of said openings in the raised lock bar whereby to hold said lever in locked position.

2. In a device as described, in combination, a vehicle frame, an elongated harrow-frame, a yoke connected thereto and pivotally connected to said frame, whereby said harrow frame may be raised and lowered, a hook shank carried between the arms of said yoke and formed with an integral hook disposed at right angles to said yoke, a plate dependingly secured upon the vehicle frame, a pivotal hook member upon said plate, the first hook adapted to engage the hook member whereby said harrow frame may be held in raised position, and means for disengaging the pivotal hook member so as to allow the harrow frame to drop.

3. In a device as described, in combination, a vehicle frame, a depending plate secured thereto, a pivotal detent on said plate, a harrow frame pivotally mounted so as to be raised and lowered on the frame, and carrying a hook adapted to engage said detent so as to hold the harrow frame in elevated position, a laterally disposed wall upon said plate, a spring extending from said last-named wall toward said detent, a finger secured upon said detent and adapted to compress said spring, and means for pivotally moving said detent against the tension of said spring to release it from said hook.

In testimony whereof I have signed my name to this specification.

NELS LARSEN BECK.